(12) United States Patent
Moran et al.

(10) Patent No.: US 11,995,060 B2
(45) Date of Patent: May 28, 2024

(54) HASHING A DATA SET WITH MULTIPLE HASH ENGINES

(71) Applicant: MAXLINEAR, INC., Carlsbad, CA (US)

(72) Inventors: Mark Abrian Moran, Milpitas, CA (US); Michael Ray Ham, San Jose, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 17/165,915

(22) Filed: Feb. 2, 2021

(65) Prior Publication Data
US 2022/0245112 A1 Aug. 4, 2022

(51) Int. Cl.
*G06F 16/22* (2019.01)
*G06F 16/215* (2019.01)

(52) U.S. Cl.
CPC ........ *G06F 16/2255* (2019.01); *G06F 16/215* (2019.01)

(58) Field of Classification Search
CPC .............. G06F 16/174; G06F 16/1748; G06F 16/1752; G06F 16/215; G06F 16/2255
See application file for complete search history.

(56) References Cited

U.S. PATENT DOCUMENTS

| | | | | |
|---|---|---|---|---|
| 9,092,151 B1 * | 7/2015 | Floyd | ................... | G06F 16/215 |
| 10,565,183 B1 * | 2/2020 | Colgrove | .............. | G06F 3/0665 |
| 2008/0098083 A1 * | 4/2008 | Shergill | ................ | G06F 16/215 |
| | | | | 709/217 |
| 2014/0012822 A1 * | 1/2014 | Aronovich | .......... | G06F 16/1752 |
| | | | | 707/692 |
| 2014/0279954 A1 * | 9/2014 | Aronovich | ............ | G06F 16/278 |
| | | | | 707/692 |
| 2015/0161159 A1 * | 6/2015 | Provenzano | ........ | G06F 16/2255 |
| | | | | 707/692 |
| 2015/0220600 A1 * | 8/2015 | Bellamkonda | ...... | G06F 16/2456 |
| | | | | 707/747 |
| 2017/0286443 A1 * | 10/2017 | Ram | ................... | G06F 11/1464 |
| 2018/0025046 A1 * | 1/2018 | Singhai | ............... | G06F 11/3409 |
| | | | | 707/692 |
| 2019/0311057 A1 * | 10/2019 | Sung | ................. | G06F 16/24542 |
| 2021/0064659 A1 * | 3/2021 | O'Hare | ............... | H03M 7/3091 |
| 2022/0244932 A1 * | 8/2022 | Lapiduz | ................. | G06F 21/64 |

FOREIGN PATENT DOCUMENTS

GB 2493832 A * 2/2013 .......... G06F 11/1453

OTHER PUBLICATIONS

Zhou et al. A data deduplication framework of disk images with adaptive block skipping. 2016. Journal of Computer Science and Technology, 31(4), 820-835. doi:http://dx.doi.org/10.1007/s11390-016-1665-z (Year: 2016).*

* cited by examiner

*Primary Examiner* — James E Richardson
(74) *Attorney, Agent, or Firm* — Buchalter; Jason W. Croft (57) ABSTRACT

A system for calculating a fingerprint across a data set by identifying a data set to hash, the data set comprising a set of data blocks, generating, by a first hash engine, a first hash for each data block in the set of data blocks within the data set, and generating, by a second hash engine, a second hash for each data block in the set of data blocks within the data set.

19 Claims, 8 Drawing Sheets

HASHING A DATA SET WITH MULTIPLE HASH ENGINES

FIELD

The embodiments discussed herein are related to hashing, deduplication, and compression.

BACKGROUND

Data sets may include duplicate data. Removing or reducing the amount of duplicate data from a data set, which is commonly referred to as deduplication, can result in storage space reduction and greater compression of the data set. Hash engines can be used to identify duplicate data in data sets.

The subject matter claimed herein is not limited to embodiments that solve any disadvantages or that operate only in environments such as those described above. Rather, this background is only provided to illustrate one example technology area where some embodiments described herein may be practiced.

SUMMARY

A system for calculating a fingerprint across a data set by identifying a data set to hash, the data set comprising a set of data blocks, generating, by a first hash engine, a first hash for each data block in the set of data blocks within the data set, and generating, by a second hash engine, a second hash for each data block in the set of data blocks within the data set.

BRIEF DESCRIPTION OF THE DRAWINGS

Example embodiments will be described and explained with additional specificity and detail through the use of the accompanying drawings in which.

DESCRIPTION OF EMBODIMENTS

Hash engines can be used to identify duplicate data in data sets. Deduplication of this deduplicate data is a key component in data reduction. Using a hash algorithm, a hash engine can generate a map of a data set of any size with a set of fixed-size values, called hashes. A hash can be a unique set of bits of a specific size that has a low chance of being repeated. Running a data set through a hash algorithm can result in a much smaller data bit size output. For example, running 32 k bits worth of data through the hash algorithm may result in an output down to 8 bits, 16 bits, 32 bits, etc.

Hash may be used to effectively identify potential duplicated data in data sets that could be deduplicated. Hash algorithms may take a data set and generate a unique set bit size result. Hashes across one or more data sets are compared to find a potential exact match that can be deduplicated. Multiple data sets may also be run through the hash algorithm. As a hash engine may process multiple data sets, the results can be compared. Hash matches among the multiple data sets may indicate that there is a high chance that the data that corresponds to the matching hashes is a duplication. All but one instance of the matching data can be removed from the multiple data sets and replaced by a pointer to the one remaining instance of the matching data. Removing the duplicate data can result in a smaller amount of storage space required to store the multiple data sets. In the event that the data is to be compressed, duplicate data would not be compressed, which may result in greater compression.

Conventionally, when compressing a data set using hardware, the data set is compressed at the same data set size as the hash. In other words, if the data set is to be compressed at 32 k bits the data would also be hashed at 32 k bits. Coupling the compression size and the hash size may cause trade-offs in storage size, efficiency, number of duplicates, etc. For example, the larger the compression size, the better the data compression on the data set may be. As the hash size increases, however, the number of matching hashes goes down, which degrades deduplication efficacy. Similarly, as hash size decreases, the number of duplicates increases, but the resulting compression is reduced as the same size is less effective. Thus, conventionally, the coupling of compression size and the hash size causes tension between these two features. Typically, neither compression nor hash size is optimized, but instead, a middle ground that achieves suboptimal for both compression and deduplication is selected.

Aspects of the present disclosure address these and other shortcomings of conventional compression and deduplication techniques. Described here are systems and methods for providing simultaneously improved compression and deduplication by decoupling the compression size and the hash size. By separating the hash size from the compression size, it allows a system to make the hash size much smaller and the smaller the hash, the more effective the hash is on being able to find duplications. For example, when hashing at 32 k bits the chances of getting multiple 32 k bits across a data set is much lower than if the hashing is done on 1 k bits or on 512 bits. Some systems described herein provide a mechanism to specify a hash size at any size, no matter what the data set size is for the compression size.

Some benefits provided by the present disclosure include increasing compression and deduplication. For example, by separating the hash size and the compression size, a very large data size may be used to get increased compression while also, on the same data set, a small hash size increases the amount of hashes on the data set which improves "hash hits" or the ability to identify and remove the duplicated data across the data set.

In an example, when a first data set A is one megabit in size and the hash size is much smaller, such as 1 kb, within this data set there may be a chunk data with the 1 kb hash that is duplicated somewhere else in the data set or in another data set B. In either case, the duplicated data may be compressed once and for the other duplicated data a pointer to the compressed data in the first data set A is tracked such that should that duplicated data be accessed with respect to data set B, the duplicated data may be retrieved from the first data set A. In at least one embodiment, the pointers/locations are identified and managed by a main storage control system that may be local or remote to the hash engine.

Aspects of the present disclosure address may also identify data to skip during hashing. Benefits to this technique may increase an amount of hash hits and overall efficiency of hashing and compression.

Some aspects of the present disclosure address may use multiple hash engines, which may each perform different hash operations on the same data set in a single pass. Benefits to this technique may further improve hash hits and compression ratios. Multiple hash engines, as an example, may have the following attributes: run different hash algorithms, run with different hash block sizes, run with different start offsets, run with different skip capabilities/settings, and/or run with any combination of the above.

Figure 1:
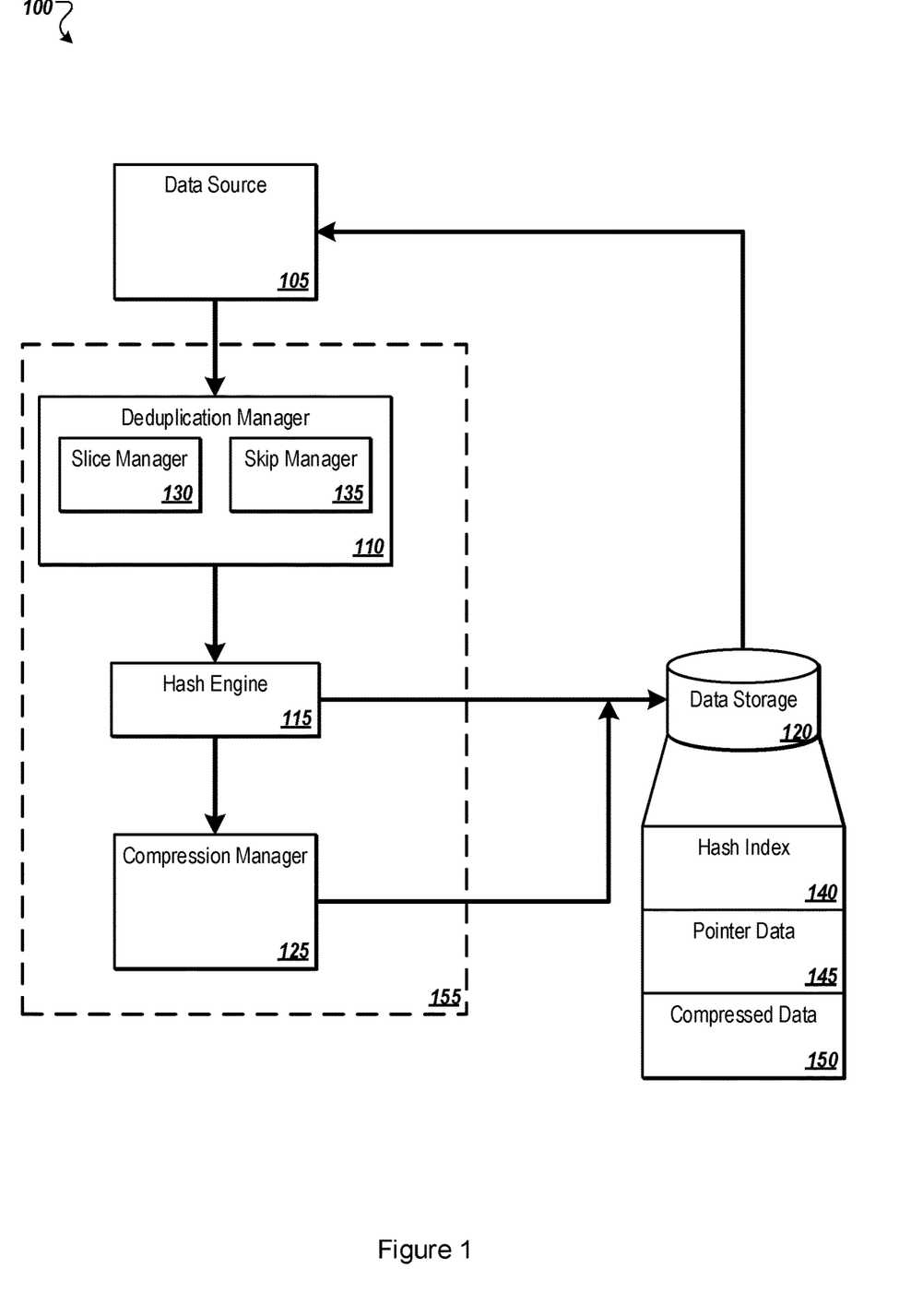
FIG. 1 illustrates an example data deduplication system.

Turning to the figures, FIG. 1 illustrates an example deduplication system 100. The deduplication system 100 may be arranged in accordance with at least one embodiment described in the present disclosure. The example deduplication system 100 may include one or more data sources 105, a deduplication manager 110, one or more hash engines 115, a data storage 120, and a compression manager 125. In at least one embodiment, the deduplication manager 110, hash engine 115, and compression manager 125 may be integrated in an acceleration card 155.

The data source 105 may include any type of device, such as a computing device, a client device, a data storage device, etc. The data source 105 may receive and send data to the deduplication manager 110 to be hashed. The data source 105 may include an interface to provide, to the deduplication manager 110, parameters by which to deduplicate the data.

The deduplication manager 110 may include or be part of a central processing unit (CPU) or may be a module that is executable by the CPU. Additionally or alternatively, the deduplication manager 110 may be a stand-alone unit that communicates with the CPU. For example, the CPU may offload various tasks to the deduplication manager 110, such as hashing, encryption, and compression.

The data source 105 may be configured to communicate with the deduplication manager 110, such as via a bus or a network. Data may be sent from the data source 105 to the deduplication manager 110 with a request to perform operations on the data, such as operations to hash, encrypt, and/or compress the data. The request may include various parameters and metadata associated with the data. The deduplication manager 110 be communicatively coupled to the hash engine 115 in relation to the performance of hashing operations.

The hash engine 115 may include circuitry, software, or a combination of circuitry and software configured to execute a hash algorithm on a set of data, such as data received from the data source 105. The hash engine 115 may be configured to execute any hash algorithm, such as MD5, SHA-1, SHA-2 (224, 256, 384, 512), or any other hash algorithm or for error-detection (e.g., checksum, cyclic redundancy check (CRC)).

The data storage 120 may include any memory or data storage. In some embodiments, the data storage 120 may include computer-readable storage media for carrying or having computer-executable instructions or data structures stored thereon. The computer-readable storage media may include any available media that may be accessed by a general-purpose or special-purpose computer, such as a processor. For example, the data storage 120 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory, or any other storage medium which may be used to carry or store desired program code in the form of computer-executable instructions or data structures and that may be accessed by a general-purpose or special-purpose computer. Combinations of the above may be included in the data storage 120. In the depicted embodiment, the data storage 120 is separate from the acceleration card 155. In some embodiments, the data storage 120 may be part of the acceleration card 155, which may interface with a host using any type of interface, such as an eight lane PCI Express 3.0 interface. In at least one embodiment, the data storage 120 may include multiple distributed data storages.

The compression manager 125 may include circuitry, software, or a combination of circuitry and software configured to execute a compression algorithm on a set of data, such as data received from the data source 105 and/or data that has been hashed. Compressed data 150 may be stored in the data storage 120. The compression manager 125 may be configured to execute any compression algorithm, such as gzip/zlib/Deflate L4, eLZS/LZS, or any other compression algorithm.

The deduplication manager 110 may include a slice manager 130 and a skip manager 135. The slice manager 130 may include a hardware module, a software module, or a combination of hardware and software configured to manage a hash operation at a smaller hash size as compared to a compression data set size. The skip manager 135 may include a hardware module, a software module, or a combination of hardware and software configured to identify some data in a data set that may be skipped during hashing.

In operation, the deduplication manager 110 may receive a data set from the data source 105. Traditionally, the hash block size is the same size as the compression data set size. The slice manager 130 decouples the hash block size from the compression data set size and permits hash block sizes for deduplication that are different than the compression data set size. The data set may include or be organized based on a set of data blocks.

The slice manager 130 may identify a data set to deduplicate, such as a data set from the data source 105. The slice manager 130 may select a hash block size that is smaller than a compression block size (that will later be used by the compression manager 125). The slice manager 130 may define a set of data blocks within the data set based on the hash block size and may instruct the hash engine 115 to generate a hash for each data block in the set of data blocks within the data set. The hash engine 115 may generate a hash for each data block in the set of data blocks within the data set, which may be stored in a hash index 140. The deduplication manager 110 may deduplicate a data block in the data set based on a respective hash for the data block. For example, to deduplicate the data block, the deduplication manager 110 may remove the duplicate data block and associate a pointer with the removed data block to another location that also stores the same data as the duplicate data. The pointer may be stored as pointer data 145. In at least one embodiment, the compression manager 125 may compress the data set based on the compression block size. In at least one embodiment, the compression manager 125 does not compress duplicate data or pointers to the duplicate data. In at least one embodiment, the hash and compression are performed on the data set in a single pass. Additionally or alternatively, the deduplication manager 110 may be instructed to execute various operations and provide results for other systems to perform the actual deduplication and manage and/or generate pointers and/or one or more tables.

The hash block size may be any size. In at least one embodiment, the hash block size may be between 1 k and 4 k bits. In at least one embodiment, when deduplicating structured or tabular data, such as data base type structure, then the data blocks may be relatively small in size so a smaller hash block size may be used. For unstructured data, for example, a larger hash block size may be used.

In at least one embodiment, the hash block size is a divisor of the total data set, such that each hash block is the same size. For example, for a total data set of 16 k bits, the hash block size may be a divisor of 16 k, such as 8 k, 4 k, 2 k, 1 k, etc. The hash block size may be a whole number, an integer, etc. In another embodiment, the hash block size is not a divisor of the total data set. In this example, all hashes are kept except for the last hash, which may be is used or discarded. For example, when the last bit is only 1 k but the hash block size is 4 k bits, the last hash of 1 k bits may be ignored or discarded. In this example, the data associated with the final, ignored or discarded hash may not be a deduplication candidate.

In at least one embodiment, the deduplication manager 110 may determine that some of the data in the data set may be skipped for hashing. In at least one embodiment, the deduplication manager 110 receives an instruction from the data source 105 to skip some of the data in the data set. Additionally or alternatively, the deduplication manager 110 may use the skip manager 135 to automatically analyze the data set to determine whether there is data in the data set to skip. The skip manager 135 may, for example, identify certain types of data that may be skipped, such as header data, footer data, database fields, predetermined data types, data protection fields (e.g., NVMe protection data, a data integrity field (DIF), data integrity extension (DIX), T10-DIF, or T10-DIX, etc.). In an example, a company-wide email is sent with a calendar invitation to a company party. Each email would include calendar data that is the same for all company employees. Each email would also include a header that would be slightly different for each employee. Under conventional systems, this email would not have been deduplicated because of the differing headers. The skip manager 135 can identify the headers as skip candidates such that the headers are skipped during the deduplication process and such that the calendar data can still be deduplicated.

In at least one embodiment, the data from data source 105 includes instructions or metadata about the data that the skip manager 135 can use to determine data to skip during deduplication. For example, the data from the data source 105 may include information and/or metadata about the data from the data source, such as a number of bits of data, header data, footer data, header size, footer size, index, index header, etc. The information and/or metadata about the data from the data source may also include an indication of a repeating pattern in the data. For example, a data provider (e.g., the data source 105) may indicate the pattern of headers in the data, which may include an offset, pattern size, and a skip count. The skip manager 135 may instruct the hash engine 115 to skip a particular size of data starting at the offset, how to identify the next data to skip, and a count for the total number of skips to perform. In this manner, the hash engine 115 may run a hash on all non-skipped data, which may result in a greater number of hash hits. An example pattern may include one or more of a description of the patterns, skip "x" number of bits, process "y" number of bits, skip "z" number of bits, process "a" number of bits, repeat, etc., where x, y, z, and a may be any number including the same number as each other, or some or all may be different than each other.

A similar technique can be used for tabular or database-type data or any other data that has an index header and data. For such data, the index header(s) would be skipped and the data can be hashed, deduplicated, and/or compressed. In at least one embodiment, a hash block size may be smaller than the amount of data between skips. In at least one embodiment, a hash block size may be larger than the amount of data between skips such that data on two sides of a "skip" may be hashed together. In at least one embodiment, the "non-skipped" data is compressed while the "skip" data is not compressed. In at least one embodiment, the skip capabilities are layers such that one set of skip rules are applied first, then a second set of skip rules can be applied on the remaining non-skipped data, and so on.

In at least one embodiment, identifying skip candidates can be automated by the skip manager 135. For example, the skip manager 135 can analyze the data before the hashing operation to identify skip candidates, which may include data that resembles "skippable" data. The skip manager 135 may have a set of criteria to use when analyzing the data. The set of criteria may identify various data that can be skipped, such as headers, footers, etc. When the skip manager 135 identifies these types of data that can be skipped, the skip manager 135 may add a flag to that data such that the hash engine 115 and/or compression manager 125 may skip that particular data when hashing/compressing the data. In at least one embodiment, the skip manager 135 may be sent training data that may be used to create an artificial intelligence (AI) unit to process the data to find "skippable" portions. In at least one embodiment, the AI unit may be supervised or unsupervised. In at least one embodiment, the skip manager 135 may refine the AI unit using input received from a system administrator. For example, the skip manager 135 may identify "skip candidates", which may be presented via an interface to the system administrator. The system administrator may provide input as to whether the skip candidates should be skipped or not. The skip manager 135 may use the system administrator data to refine the AI unit to better identify skip candidates.

In at least one embodiment, the data includes metadata that identifies skippable data. The skippable data can include predetermined standards for data that are in a precise or predetermined format. For example, the predetermined standards can include NVMe protection data, such as T10-DIF data, T10-DIX data, etc.

By identifying NVMe protection fields, the skip manager 135 and the hash engine 115 can avoid hashing those NVMe protection fields, which may include DIF data, metadata, etc. Similarly, the compression manager 120 can avoid compressing those NVMe protection fields.

In at least one embodiment, when the skip manager 135 encounters a NVMe protection field in a data set, the skip manager 135 can provide precise instructions to the hash engine 115 to skip those NVMe protection fields.

In at least one embodiment, the skip manager 135 may determine that the data set is formatted using "NVMe Protect, DIF configuration." The skip manager 135 may determine that under that configuration, either the DIF data, the metadata, or both the DIF data and the metadata may be skipped. The metadata associated with the data set may indicate which of these selections to make. If not, the skip manager 135 may determine which to make or may rely on a default setting for selection. The skip manager 135 may instruct the hash manager 115 to hash a particular portion of the data set at a given data hash size, then skip the metadata and/or DIF data, then hash a next portion of the data set at the given data hash size, until all of the data in the data set (except for the skip data) has been hashed.

These techniques to identify and skip portions of a data set for hashing, deduplication and compression may provide significant gains to the CPU. By doing this skipping in the hardware in some embodiments, software CPU time is reduced. For database structures, these techniques may result in 2×, 3×, or even 5× de-duplication rates.

Modifications, additions, or omissions may be made to the deduplication system 100 without departing from the scope of the present disclosure. All constructs provided herein may be implemented in a stateless operation where all data to be operated on are supplied in a single command. Additionally or alternatively, for stateful structures where data that is part of this single command continue to be submitted in subsequent commands, these functions can continue where they left off. Further, all constructs provided herein may be implemented in one or more stateful operations.

Figure 2:
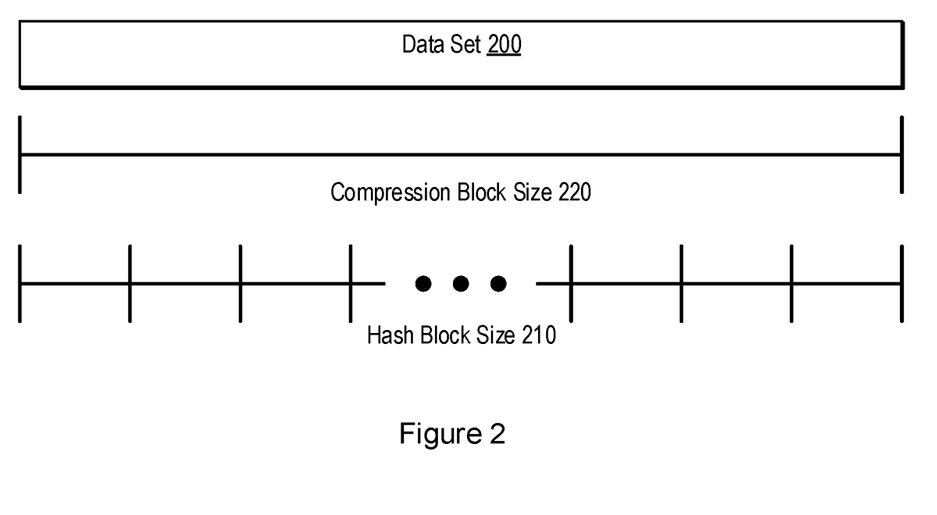
FIG. 2 illustrates a data set that may be hashed at a hash block size and compressed at a compression block size.

FIG. 2 illustrates a data set 200 that may be hashed at a hash block size 210 and compressed at a compression block size 220. The hash block size 210 may be a different value, as compared to the compression block size 220. As illustrated, the compression block size 220 appears equal in size to the size of the data set 200, but the compression block size 220 may be any size including a size that is less than the size of the data set 200. The hash block size 210 may be any size including larger than the size of the compression block size.

Figure 3:
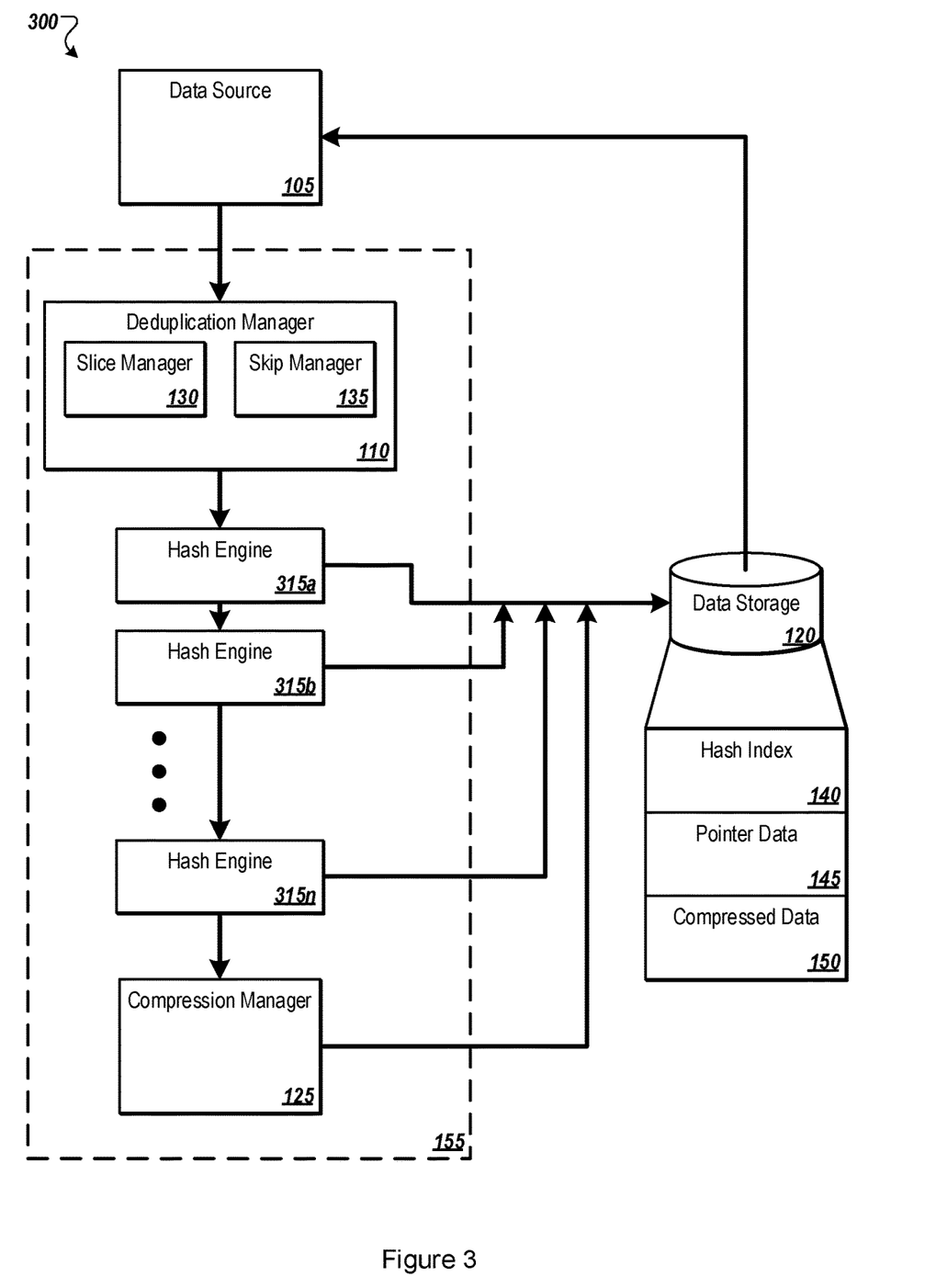
FIG. 3 illustrates another example data deduplication system with multiple hash engines.

FIG. 3 illustrates another example data deduplication system 300 with multiple hash engines 315a, 315b, 315n. The data deduplication system 300 may be similar to, and may include similar components as, the data deduplication system 100 of FIG. 1. The data deduplication system 300 may include multiple hash engines 315a, 315b, 315n, which may be similar to the hash engine 115 of FIG. 1. The data deduplication system 300 may be used to deduplicate any type of data, including multiple similar documents, such as multiple versions of a single document. For example, if a user generates a text-based document and then makes a new version of the text-based document but with changes to the spaces, additional words, etc., now nothing in this text-based document lines up anymore for the purposes of hashing and deduplication of data in the text-based document, even though the two versions of the text-based documents are virtually identical. The multiple hash engines 315 can each be configured differently to each hash the original text-based document and the new version of the text-based document for deduplication.

Figure 4:
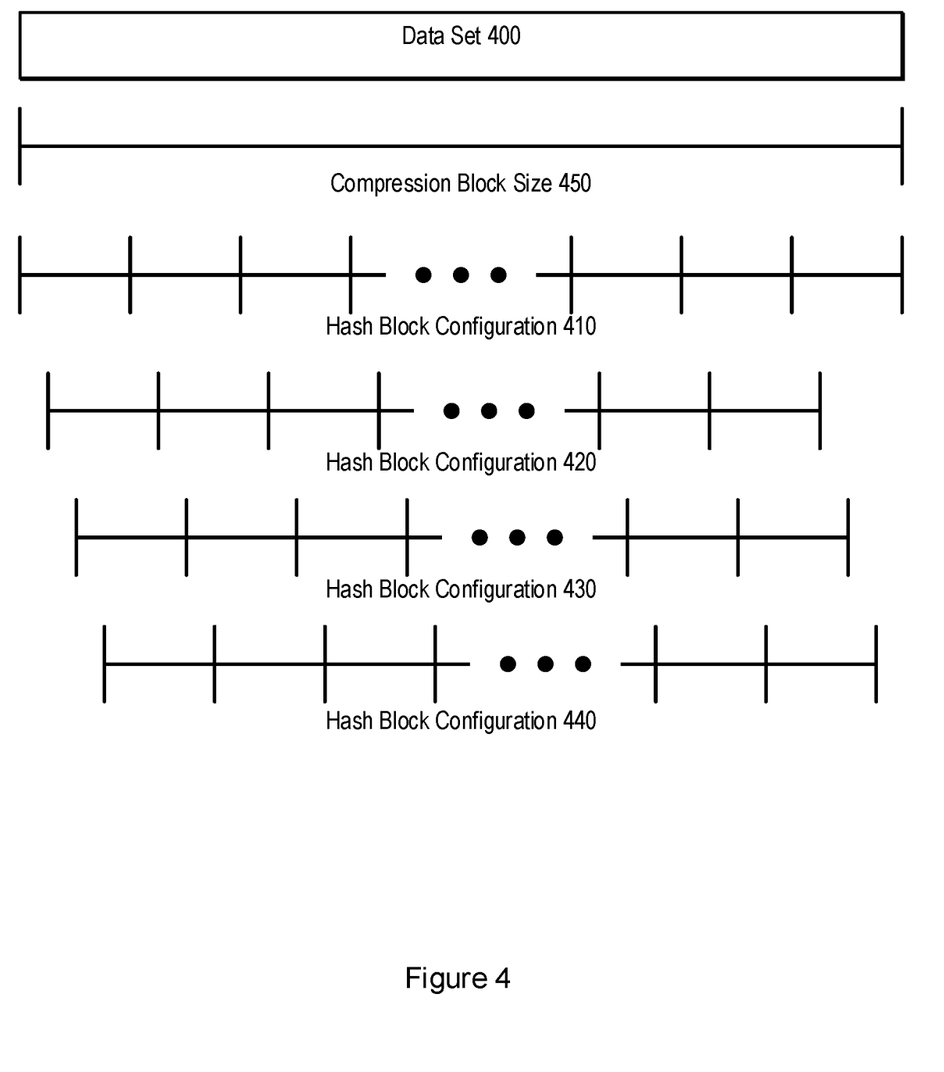
FIG. 4 illustrates a data set that may be hashed by different hash engines, each at a different hash block size, and compressed at a compression block size.

Each of the hash engines 315a, 315b, 315n may be configured at any hash block size, which may differ among the hash engines 315a, 315b, 315n as illustrated in FIG. 4. For example, a first hash engine 315a may hash data at a first hash block size, a second hash engine 315b may hash data at a second hash block size, and a "nth" hash engine 315n may hash data at a third hash block size. Further, each hash engines 315a, 315b, 315n may be configured to begin a hashing operation on a data set at an offset, as also illustrated in FIG. 4. For example, the first hash engine 315a may hash data using a first offset, the second hash engine 315b may hash data using a second offset, and the "nth" hash engine 315n may hash data using a third or "nth" offset.

In another example, and as illustrated in FIG. 4, to stay on a 32 k bits block of the data set and a hash block size of 4 k bits, the first hash engine 315a may hash the data set with a first hash block configuration 410 (e.g., hash block size of 4 k bits, offset of zero), the second hash engine 315b may hash the data set with a second hash block configuration 420 (e.g., hash block size of 4 k bits, offset of 1 k bits), a third hash engine (not illustrated) may hash the data set with a third hash block configuration 430 (e.g., hash block size of 4 k bits, offset at 2 k bits), and the nth hash engine 315n may hash the data set with a fourth hash block configuration 440 (e.g., hash block size of 4 k bits, offset at 3 k bits). As described in the above example, the hash block sizes among the hash block configurations are the same with different offsets. Alternatively, the hash block sizes among the hash block configurations may be different with also different offsets. Alternatively, the hash block sizes among the hash block configurations may be different with the same offsets. Another parameter of the hash block configurations may include a hash algorithm. Each of the hash engines 315 may use the same or different hash algorithms when hashing the same data set.

In embodiments, data set size, hash block size, and hash engine offsets are not required to be the same or to be on byte boundaries. In at least one embodiment, hash engines may stop after "x" number of hashes and may return hashes across full "hash blocks." Additionally or alternatively, hash engines can continue and return hashes across a remainder of "partial hash blocks" at the end of a command. For stateful operation on a slice hash, a last hash option may be beneficial since the hashes on the partial hash blocks at the end of the command can be resumed, continued, and completed in a "next" command that is statefully added to the current command.

In another example, the hash engines 315 could each start on bit zero and each of the hash engines 315 may use independent algorithms. The hashes may be stored under the different algorithms, which may be useful to verify or check for misduplication hits. Another benefit of using multiple hash engines 315 to hash the same data set in a single pass may help with deduplication among multiple types of systems, such as an older system using one type of hash block configuration, and a newer system using another hash block configuration (such as a more advanced hash). This flexibility with the hash block configurations may allow the multiple hash engines 315 to generate multiple hashes so that even across a cluster where there may be various storage appliances with various hash tables, the multiple hash engines 315 can generate hashes off of the data in a single pass without having to run through multiple times. Additionally or alternatively, an existing system may be migrated from a smaller hashing algorithm to a newer or larger hashing algorithm to improve deduplication or add capacity that might have increased collisions on the older algorithm. In at least one embodiment, the hash block configurations may be set globally or set independently for each of the hash engines 315. The hash engines 315 may store the various hashes in the hash index 140, which may be accessible by the data source 105.

In at least one embodiment, hashes for each hash engine 315 may be analyzed to identify hash hits. The number of hash hits between hash engines 315 may differ because of the different hash block configurations that are being used for the hash engines 315. In at least one embodiment, the hashes that correspond to the highest number of hash hits may be selected for deduplication, thus increasing the performance of the deduplication system.

In at least one embodiment, duplicate data may cross a hash boundary, meaning a first portion of the duplicate data is part of a first hash of the data set, and a second portion of the duplicate data is part of a second hash of the data set. In this instance, the hashes that correspond to the highest number of hash hits or hashed bytes may be selected for deduplication.

For scenarios where there is no duplicate data that overlaps a hash boundary, hashes from all multiple hash engines 315 may be used to deduplicate the data set. When hashes from fewer than all of the hash engines 315 overlap, then one of the overlapping set may be selected and the others discarded. For example, if five hash engines 315 each run hashes on a data set in a single pass, and there are overlaps between three of the five hash engines 315, then one of those three is selected along with the two with no overlaps. The selected hashes may be used to deduplicate the data set. Deduplication in this manner can result in a higher ratio of deduplicates, and a higher compression ratio.

In at least one embodiment, the data deduplication system 300 may also use hash block sizes that are different than the compression block size, as discussed in more detail in conjunction with FIG. 1. Moreover, the data deduplication system 300 may use the skip techniques when hashing, as further described in conjunction with FIG. 1. For example, each of the multiple hash engines 315 may identify data to skip when hashing the data set. Each of the multiple hash engines 315 may skip the same data or, alternatively, may skip different data. The multiple hash engines 315 may skip different data when, for example, skippable data falls on a hash boundary. In at least one embodiment, the multiple hash engines 315 identify data to skip before creating hash boundaries.

Modifications, additions, or omissions may be made to the deduplication system 300 without departing from the scope of the present disclosure.

FIG. 4 illustrates a data set 400 that may be hashed by different hash engines, each with a different hash block configuration 410, 410, 420, 430, 440, and compressed at a compression block size 450. The hash block configuration may include various adjustable parameters, such as hash block size, offset, algorithm, etc. In at least one embodiment, the hash block size(s) may be fully independent from the other hash engines, data set sizes, and/or compression block sizes. In at least one embodiment, the hash block sizes can be variable from one hash block to the next. An embodiment that would take advantage of this capability may include a hash algorithm employed by one or more engines that uses a rolling hash to find margins to begin hashing on. An example hash algorithm may include a Rabin-Karp hash algorithm. Each engine could have different margin values or be programmed to not start on same margin to find best margin as an example.

Figure 5:
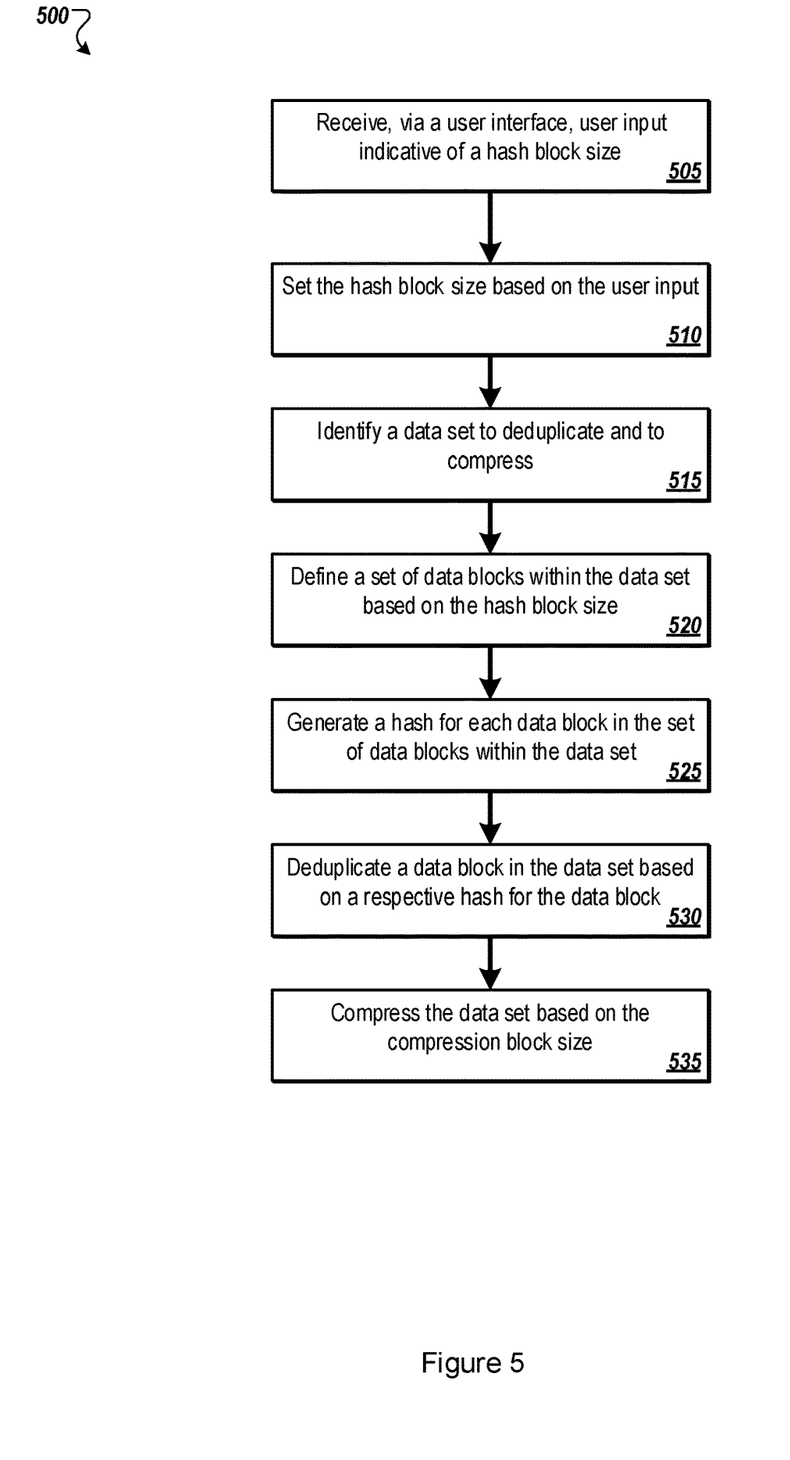
FIG. 5 illustrates a flow diagram of an example method for hashing a data set.
Figure 6:
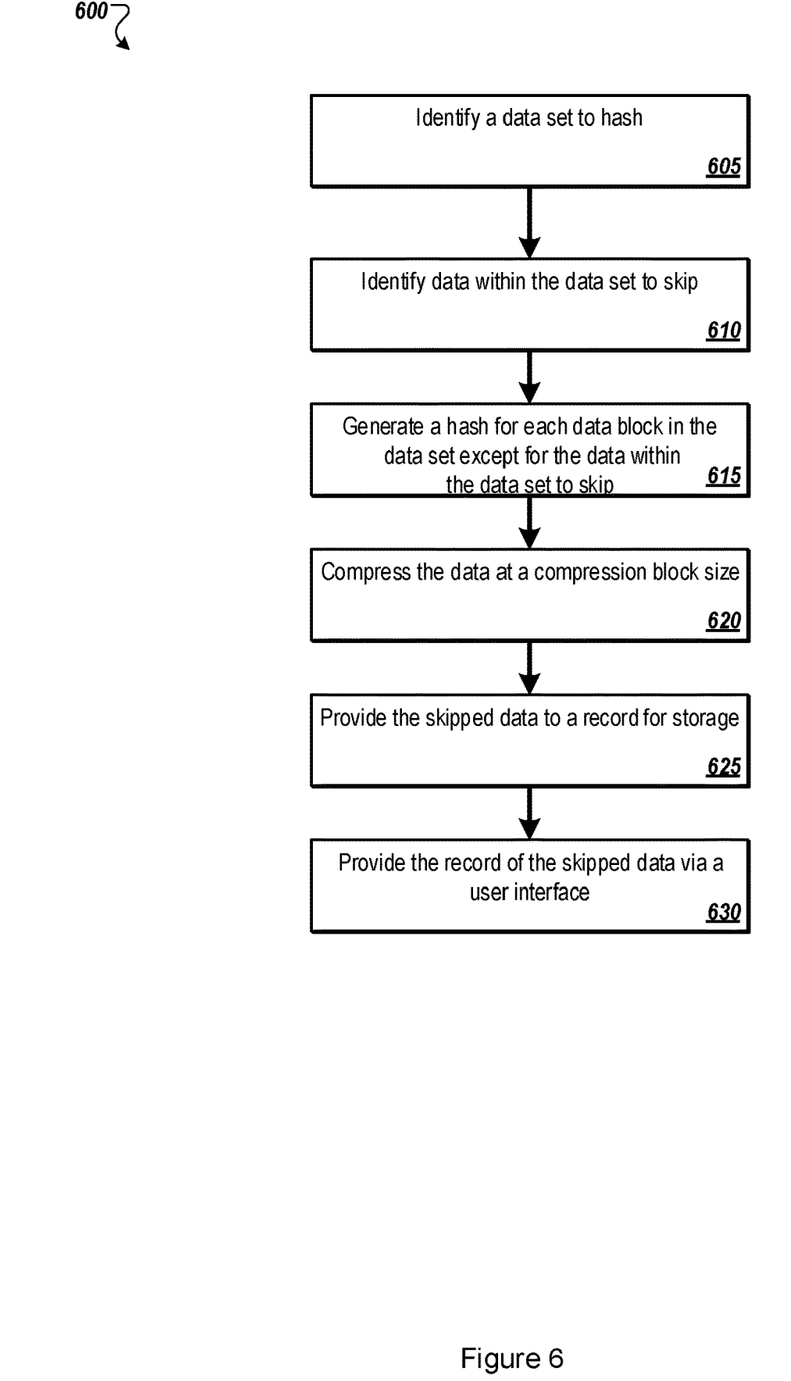
FIG. 6 illustrates a flow diagram of another example method for hashing a data set.
Figure 7:
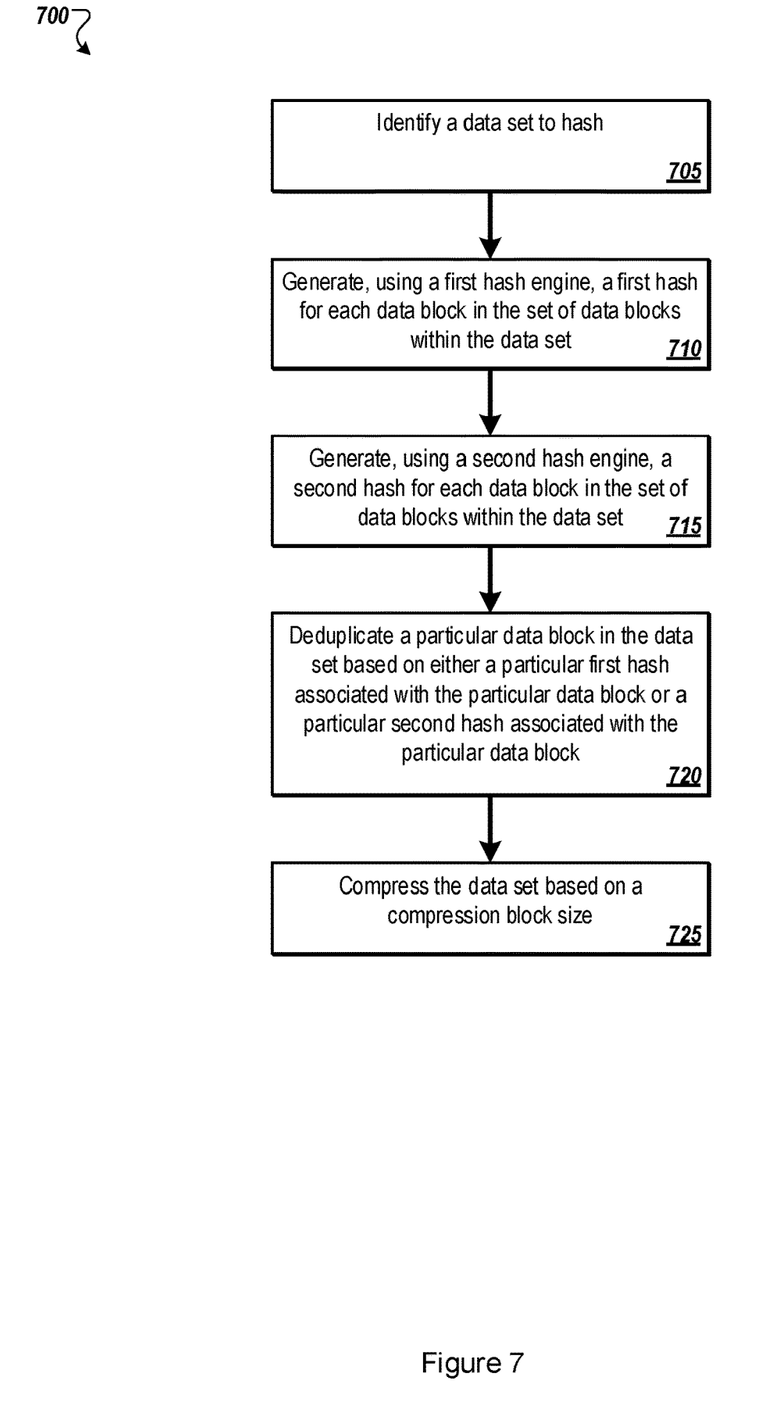
FIG. 7 illustrates a flow diagram of yet another example method for hashing a data set.

FIGS. 5-7 illustrate flow diagrams of example methods related to hashing and deduplication. The methods may be performed by processing logic that may include hardware (circuitry, dedicated logic, etc.), software (such as is run on a general purpose computer system or a dedicated machine), or a combination of both, which processing logic may be included in the deduplication manager 110, the hash engine 115 (or hash engines 315), the compression manager 125, and/or the acceleration card 155 of FIGS. 1 and 3, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 5 illustrates a flow diagram of an example method 500 for hashing a data set. The method 500 may begin at block 505, where processing logic may receive, via a user interface, user input indicative of a hash block size. At block 510, the processing logic may set the hash block size based on the user input.

At block 515, the processing logic may identify a data set to deduplicate (based on a hash block size) and to compress (based on a compression block size). The hash block size may be smaller than the compression block size. The compression block size may be at least twice a size of the hash block size. The hash block size may be a divisor of the compression block size. The data set may include an electronic file. The compression block size may be equal to a size of the electronic file. At block 520, the processing logic may define a set of data blocks within the data set based on the hash block size.

At block 525, the processing logic may generate a hash for each data block in the set of data blocks within the data set. Additionally or alternatively, the processing logic may generate a first instruction to generate a hash for each data block in the set of data blocks within the data set.

At block 530, the processing logic may deduplicate a data block in the data set based on a respective hash for the data block. In at least one embodiment, the deduplicated data block is not to be compressed. Additionally or alternatively, the processing logic may generate a second instruction to deduplicate a data block in the data set based on a respective hash for the data block.

At block 535, the processing logic may compress the data set based on the compression block size. In at least one embodiment, the compression block size may not be an integer multiple of the hash block size. A second data block of the set of data blocks may have a unique hash block size. Compressing the data set based on the compression block size may include at least one of refraining from compressing the second data block or discarding a hash that is associated with the second data block. Additionally or alternatively, the processing logic may generate a third instruction to compress the data set based on the compression block size.

FIG. 6 illustrates a flow diagram of another example method 600 for hashing a data set. The method 600 may begin at block 605, where processing logic may identify a data set to hash, the data set comprising a set of data blocks.

At block 610, the processing logic may identify data within the data set to skip. In at least one embodiment, the data within the data set to skip includes at least one of: data that is characterized as a pattern, a header, a footer, non-volatile memory express (NVMe) protection data, or error recovery control data. In at least one embodiment, identifying data within the data set to skip includes: identifying a skip candidate in the data set, providing the skip candidate to be provided via interface, and receiving a confirmation of the skip candidate.

At block 615, the processing logic may generate a hash for each data block in the set of data blocks within the data set except for the data within the data set to skip. In at least one embodiment, identifying data within the data set to skip includes determining that the data includes a repeating field. The repeating field may include a particular byte count. In at least one embodiment, generating the hash for each data block in the set of data blocks within the data set except for the data within the data set to skip includes identifying the first byte of the field and skipping a number of bytes equal to the byte count. In at least one embodiment, generating the hash for each data block in the set of data blocks within the data set except for the data within the data set to skip includes skipping data based on offset and count.

At block 620, the processing logic may compress the data at a compression block size. At block 625, the processing logic may provide the skipped data to a record for storage. At block 630, the processing logic may provide the record of the skipped data via a user interface. In at least one embodiment, there may be no skips on the source data and all the hashing including offsets can be performed on the compressed data.

FIG. 7 illustrates a flow diagram of yet another example method 700 for hashing a data set. The method 700 may begin at block 705, where processing logic may identify a data set to hash. The data set may include a set of data blocks.

At block 710, the processing logic may generate, using a first hash engine, a first hash for each data block in the set of data blocks within the data set. In at least one embodiment, the first hash engine may be configured to generate the first hash using a first hash algorithm. In at least one embodiment, the first hash engine may be configured to generate the first hash based on a first hash block size. In at least one embodiment, the first hash engine may be configured to generate the first hash starting at a first bit of the data set.

At block 715, the processing logic may generate, using a second hash engine, a second hash for each data block in the set of data blocks within the data set. In at least one embodiment, the second hash engine may be configured to generate the second hash using a second hash algorithm. In at least one embodiment, the second hash engine may be configured to generate the second hash based on a second hash block size. In at least one embodiment, the second hash engine may be configured to generate the second hash at a second bit of the data set. The first bit of the data set may be bit zero and the second bit of the data set may be determined based on an offset from the first bit. In at least one embodiment, the processing logic may receive a selection of the first hash engine and the second has engine from an available set of hash engines.

At block 720, the processing logic may deduplicate a particular data block in the data set based on either a particular first hash associated with the particular data block or a particular second or subsequent hash associated with the particular data block. At block 725, the processing logic may compress the data set based on a compression block size. In at least one embodiment, hashing may occur after data compression.

Figure 8:
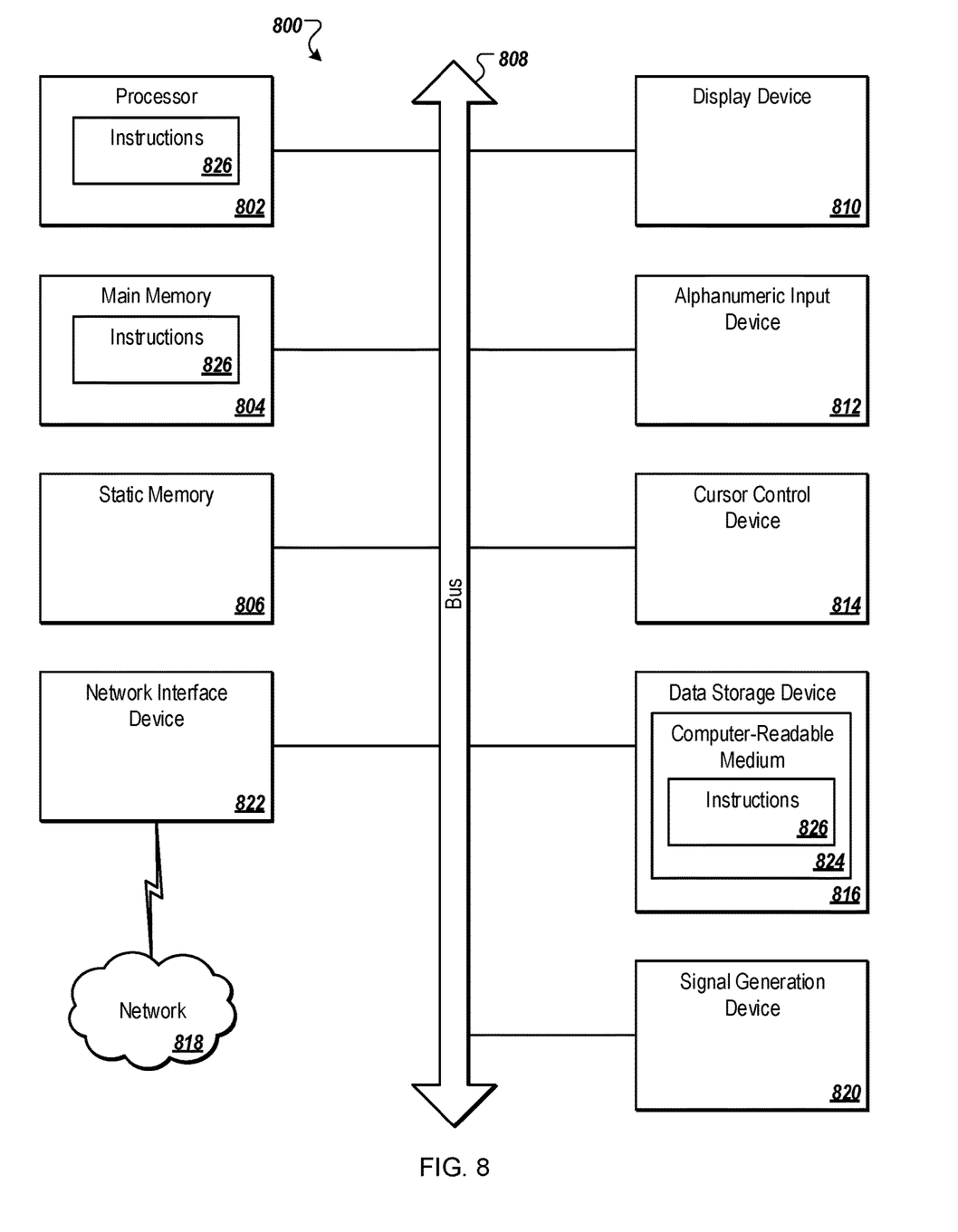
FIG. 8 illustrates a diagrammatic representation of a machine in the example form of a computing device within which a set of instructions, for causing the machine to perform any one or more of the methods discussed herein, may be executed.

FIG. 8 illustrates a diagrammatic representation of a machine in the example form of a computing device 800 within which a set of instructions, for causing the machine to perform any one or more of the methods discussed herein, may be executed. The computing device 800 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one embodiment, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    identifying a data set to hash based on a first hash block size, the data set comprising a set of data blocks;
    generating, by a first hash engine, a first hash for each data block in the set of data blocks within the data set, wherein the first hash engine is configured to generate the first hash based on the first hash block size;
    generating, by a second hash engine, a second hash for each data block in the set of data blocks within the data set, wherein the second hash engine is configured to generate the second hash based on a second hash block size, the first hash block size being different than the second hash block size;
    deduplicating the data set is based on the first hash and the second hash; and
    compressing the data set based on a compression block size, the first hash block size being a different block size than the compression block size.

2. The method of claim 1, further comprising deduplicating a particular data block in the data set based on either a particular first hash associated with the particular data block or a particular second hash associated with the particular data block.

3. The method of claim 1, further comprising receiving a selection of the first hash engine and the second hash engine from an available set of hash engines.

4. The method of claim 1, wherein the first hash engine is configured to generate the first hash using a first hash algorithm, wherein the second hash engine is configured to generate the second hash using a second hash algorithm.

5. The method of claim 1, wherein the first hash engine is configured to generate the first hash starting at a first bit of the data set, wherein the second hash engine is configured to generate the second hash at a second bit of the data set.

6. The method of claim 5, wherein the first bit of the data set is bit zero, wherein the second bit of the data set is determined based on an offset from the first bit.

7. The method of claim 1, wherein the first hash engine is associated with first circuitry, the second hash engine being associated with second circuitry.

8. The method of claim 1, wherein the first hash block size is independent of a second hash block size of the second hash engine and of a third hash block size of a third hash engine.

9. The method of claim 1, wherein the first hash engine uses a rolling hash to find a margin to begin generating the first hash for each data block in the set of data blocks within the data set.

10. A system, comprising:
one or more processors configured to:
identify a data set to hash based on a first hash block size, the data set comprising a set of data blocks;
implement a first hardware-based hash engine to generate, based on a first hash block size, a first hash for each data block in a set of data blocks within a data set based on a first hash block configuration, wherein the first hardware-based hash engine is configured to generate the first hash based on the first hash block size;
implement a second hardware-based hash engine to generate a second hash for each data block in the set of data blocks within the data set based on a second hash block configuration, wherein the second hardware-based hash engine is configured to generate the second hash based on a second hash block size, the first hash block size being different than the second hash block size;
deduplicate the data set is based on the first hash and the second hash; and
implement a compression manager to compress the data set based on a compression block size, the first hash block size being a different block size than the compression block size.

11. The system of claim 10, one or more processors further configured to deduplicate a particular data block in the data set based on either a particular first hash associated with the particular data block or a particular second hash associated with the particular data block.

12. The system of claim 10, wherein the first hardware-based hash engine is configured to generate the first hash using a first hash algorithm, wherein the second hardware-based hash engine is configured to generate the second hash using a second hash algorithm.

13. The system of claim 10, wherein the first hardware-based hash engine is configured to generate the first hash starting at a first bit of the data set, wherein the second hardware-based hash engine is configured to generate the second hash at a second bit of the data set.

14. The system of claim 13, wherein the first bit of the data set is bit zero, wherein the second bit of the data set is determined based on an offset from the first bit.

15. The system of claim 10, wherein first circuitry comprises the first hash engine, wherein second circuitry comprises the second hash engine.

16. A system, comprising:
one or more processors and a memory, the one or more processors configured to:
identify a data set to hash based on a first hash block size, the data set comprising a set of data blocks;
implement a deduplication manager to receive the data set to deduplicate;
implement a first hash engine to generate, based on a first hash block size, a first hash for each data block in a set of data blocks within the data set based on a first hash block configuration;
implement a second hash engine to generate a second hash for each data block in the set of data blocks within the data set based on a second hash block configuration, wherein the deduplication manager is configured to deduplicate the data set based on the first hash and the second hash; and
implement a compression manager to compress the data set based on a compression block size without compressing duplicate data in the data set, the first hash block size being a different block size than the compression block size.

17. The system of claim 16, wherein the data set is deduplicated by removing a particular data block in the data set based on either a particular first hash associated with the particular data block or a particular second hash associated with the particular data block.

18. The system of claim 16, wherein the first hash engine is configured to generate the first hash using a first hash algorithm, wherein the second hash engine is configured to generate the second hash using a second hash algorithm.

19. The system of claim 16, wherein the first hash engine is configured to generate the first hash starting at a first bit of the data set, wherein the second hash engine is configured to generate the second hash at a second bit of the data set.

* * * * *